Figure 1:
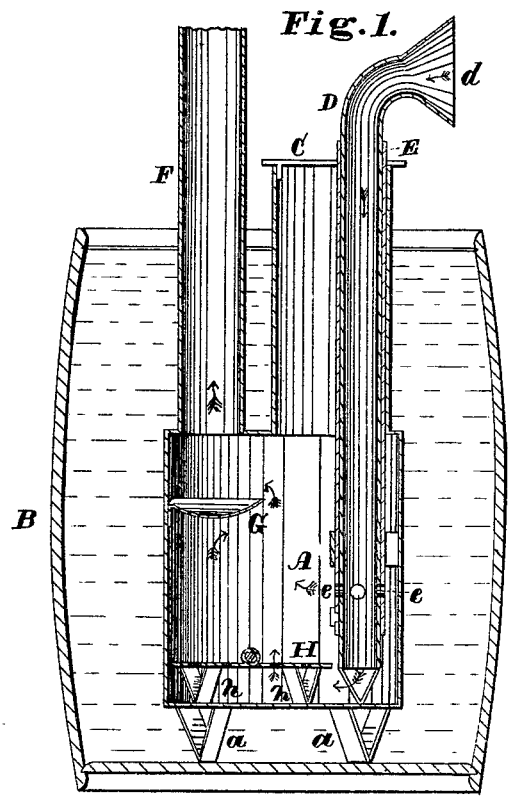

I. MARRS.
AGRICULTURAL BOILERS.

No. 183,811. Patented Oct. 31, 1876.

WITNESSES:
Jno. W. Lyon
Levi P. Graham

INVENTOR:
IRA MARRS.
Per Chas. P. Housum
His Atty

UNITED STATES PATENT OFFICE.

IRA MARRS, OF FRIEND'S CREEK TOWNSHIP, MACON COUNTY, ILLINOIS.

IMPROVEMENT IN AGRICULTURAL BOILERS.

Specification forming part of Letters Patent No. 183,811, dated October 31, 1876; application filed April 17, 1876.

*To all whom it may concern:*

Be it known that I, IRA MARRS, of Friend's Creek township, in the county of Macon and State of Illinois, (post-office address Cisco, Piatt county, Illinois,) have invented a new and useful Improvement in Agricultural Boiler, which improvement is fully set forth in the following specification, reference being had to the accompanying drawing.

My invention relates to an improvement in agricultural boilers; and consists of a cylindrical furnace provided with suitable pipes for the introduction of the fuel and for draft, said draft-pipe provided with a funnel, and capable of being turned to the direction of the wind, a casing placed over said draft-pipe so arranged as to convey air above the hinged grate. The hinged grate can be readily removed to clean out the furnace.

Figure 1 is a central vertical section of an agricultural boiler embodying my invention.

A represents the cylindrical furnace, provided with the legs *a a*. This furnace is placed in the barrel B, and surrounded with water and grain for cooking; or it may be used for heating water for scalding hogs, &c. C is a pipe, through which fuel is introduced; D, the draft-pipe, provided with the funnel *d*. A pipe, E, surrounds the draft-pipe, and extends up beyond the pipe C. Suitable perforations *e e* are made in the pipes D E, and the pipe can be turned so as to clear the openings, so as to admit air above the grate after the fire is started. F is the smoke-pipe with a deflector, G, placed under it. H is a hinged grate, provided with the legs *h h*. This grate, folded up, can be removed from the furnace for cleaning out ashes.

I claim as my invention—

In an agricultural boiler, the combination of the furnace A, pipe C, draft-pipe D, with its funnel *d*, pipe E, hinged grate H, deflector G, and smoke-pipe F, as shown and described.

IRA MARRS.

Witnesses:
 LEVI P. GRAHAM,
 FRANCIS J. DAVES.